(12) United States Patent
Mc Kee

(10) Patent No.: US 6,318,781 B1
(45) Date of Patent: Nov. 20, 2001

(54) PICKUP TRUCK STORAGE DEVICE

(76) Inventor: Richard A. Mc Kee, 1520 53rd St. North, St. Petersburg, FL (US) 33710

( * ) Notice: Subject to any disclaimer, the term of this patent is extended or adjusted under 35 U.S.C. 154(b) by 0 days.

(21) Appl. No.: 09/697,971

(22) Filed: Oct. 26, 2000

(51) Int. Cl.$^7$ ...................................................... B62C 1/06
(52) U.S. Cl. ...................................... 296/26.09; 296/37.6
(58) Field of Search ............................... 296/37.6, 26.08, 296/26.09; 312/330.1

(56) References Cited

U.S. PATENT DOCUMENTS 4,469,364 * 9/1984 Rafi-Zadeh ........................... 296/37.6
4,733,898 * 3/1988 Williams ........................... 296/37.6 X
4,830,242 * 5/1989 Painter .............................. 296/37.6 X

* cited by examiner

Primary Examiner—Joseph D. Pape

(57) ABSTRACT

A pickup truck storage device for placing items in a device which may have articles stacked there upon. The pickup truck storage device includes a housing having a top wall, a bottom wall, a back wall, a first side wall and a second side wall such that a front side of the housing is generally open. A drawers is extendably positionable through the front side and into the housing. The drawer has a front side, a back side, a bottom side, a first lateral side and a second lateral side. Each of a pair of elongate flanges is integrally coupled to and extends downwardly away from a bottom edge of one of the first and second lateral sides. Each of the lateral sides has an inside surface and an outside surface. Each of a pair of legs has an end hingedly coupled to an inside surface of one of the flanges and positioned generally adjacent to the front side. The housing is positioned in the bed of a pickup truck for use in storing items in.

17 Claims, 7 Drawing Sheets

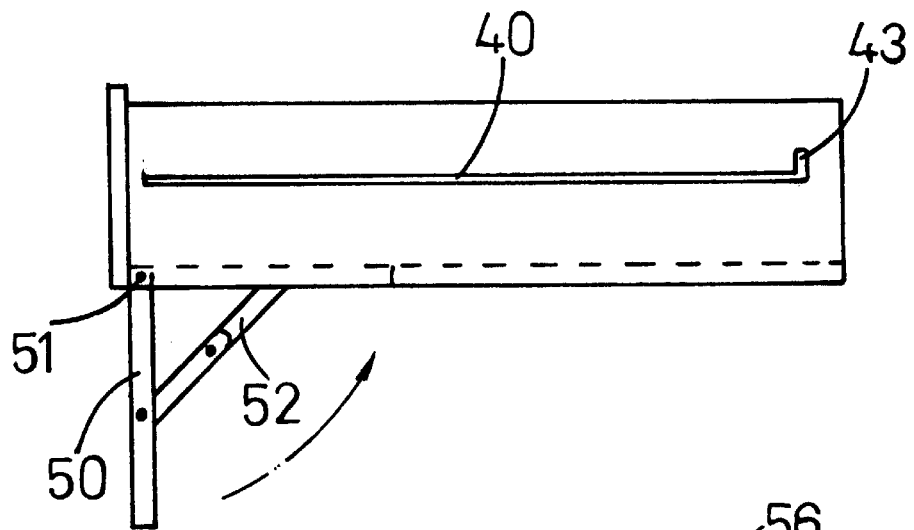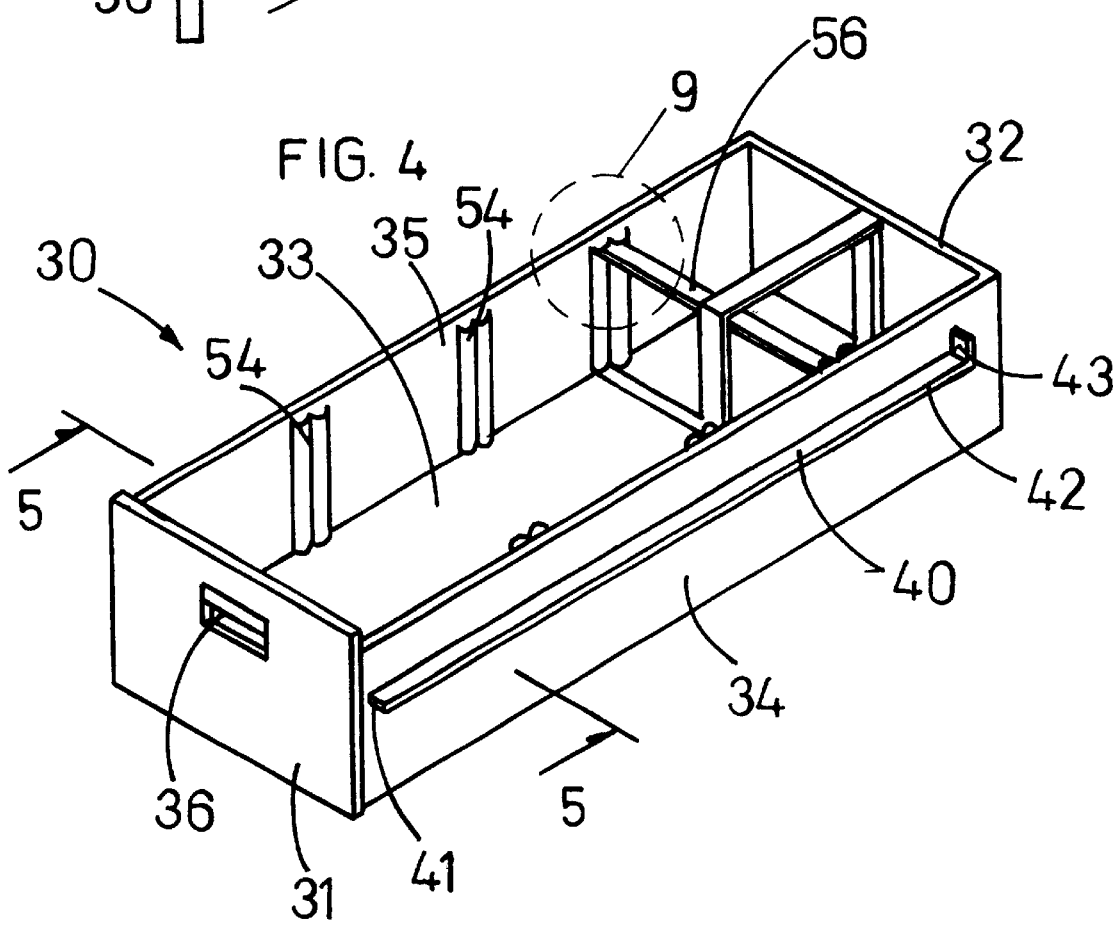

PICKUP TRUCK STORAGE DEVICE

BACKGROUND OF THE INVENTION

1. Field of the Invention

The present invention relates to pickup storage devices and more particularly pertains to a new pickup truck storage device for placing items in a device which may have articles stacked there upon.

2. Description of the Prior Art

The use of pickup storage devices is known in the prior art. More specifically, pickup storage devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,419,476; U.S. Pat. No. 4.911,493; U.S. Pat. No. 5,988,473; U.S. Pat. No. 5,186,510; U.S. Pat. No. 5,406,560; and U.S. Pat. No. 320,372.

While these devices fulfill their respective, particular objectives and requirements, the aforementioned patents do not disclose a new pickup truck storage device. The inventive device includes a housing having a top wall, a bottom wall, a back wall, a first side wall and a second side wall such that a front side of the housing is generally open. A drawers is extendably positionable through the front side and into the housing. The drawer has a front side, a back side, a bottom side, a first lateral side and a second lateral side. Each of a pair of elongate flanges is integrally coupled to and extends downwardly away from a bottom edge of one of the first and second lateral sides. Each of the lateral sides has an inside surface and an outside surface. Each of a pair of legs has an end hingedly coupled to an inside surface of one of the flanges and positioned generally adjacent to the front side. The housing is positioned in the bed of a pickup truck for use in storing items in.

In these respects, the pickup truck storage device according to the present invention substantially departs from the conventional concepts and designs of the prior art, and in so doing provides an apparatus primarily developed for the purpose of placing items in a device which may have articles stacked there upon.

SUMMARY OF THE INVENTION

In view of the foregoing disadvantages inherent in the known types of pickup storage devices now present in the prior art, the present invention provides a new pickup truck storage device construction wherein the same can be utilized for placing items in a device which may have articles stacked there upon.

The general purpose of the present invention, which will be described subsequently in greater detail, is to provide a new pickup truck storage device apparatus and method which has many of the advantages of the pickup storage devices mentioned heretofore and many novel features that result in a new pickup truck storage device which is not anticipated, rendered obvious, suggested, or even implied by any of the prior art pickup storage devices, either alone or in any combination thereof.

To attain this, the present invention generally comprises a housing having a top wall, a bottom wall, a back wall, a first side wall and a second side wall such that a front side of the housing is generally open. A drawers is extendably positionable through the front side and into the housing. The drawer has a front side, a back side, a bottom side, a first lateral side and a second lateral side. Each of a pair of elongate flanges is integrally coupled to and extends downwardly away from a bottom edge of one of the first and second lateral sides. Each of the lateral sides has an inside surface and an outside surface. Each of a pair of legs has an end hingedly coupled to an inside surface of one of the flanges and positioned generally adjacent to the front side. The housing is positioned in the bed of a pickup truck for use in storing items in.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other Structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is there fore an object of the present invention to provide a new pickup truck storage device apparatus and method which has many of the advantages of the pickup storage devices mentioned heretofore and many novel features that result in a new pickup truck storage device which is not anticipated, rendered obvious, suggested, or even implied by any of the prior art pickup storage devices, either alone or in any combination thereof.

It is another object of the present invention to provide a new pickup truck storage device which may be easily and efficiently manufactured and marketed.

It is a further object of the present invention to provide a new pickup truck storage device which is of a durable and reliable construction.

An even further object of the present invention is to provide a new pickup truck storage device which is susceptible of a low cost of manufacture with regard to both materials and labor, and which accordingly is then susceptible of low prices of sale to the consuming public, thereby making such pickup truck storage device economically available to the buying public.

Still yet another object of the present invention is to provide a new pickup truck storage device which provides in the apparatuses and methods of the prior art some of the advantages thereof, while simultaneously overcoming some of the disadvantages normally associated therewith.

Still another object of the present invention is to provide a new pickup truck storage device for placing items in a device which may have articles stacked there upon.

Yet another object of the present invention is to provide a new pickup truck storage device which includes a housing having a top wall, a bottom wall, a back wall, a first side wall and a second side wall such that a front side of the housing is generally open. A drawers is extendably positionable through the front side and into the housing. The drawer has a front side, a back side, a bottom side, a first lateral side and a second lateral side. Each of a pair of elongate flanges is integrally coupled to and extends downwardly away from a bottom edge of one of the first and second lateral sides. Each of the lateral sides has an inside surface and an outside surface. Each of a pair of legs has an end hingedly coupled to an inside surface of one of the flanges and positioned generally adjacent to the front side. The housing is positioned in the bed of a pickup truck for use in storing items in.

Still yet another object of the present invention is to provide a new pickup truck storage device that has drawers having legs thereon which may fold down to support an elongate drawer.

Even still another object of the present invention is to provide a new pickup truck storage device that has saddles thereon for preventing movement of the device in the pickup bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of a drawer of the present invention.

FIG. 4 is a schematic perspective view of a drawer of the present invention.

DESCRIPTION OF THE PREFERRED EMBODIMENT

Figure 1:
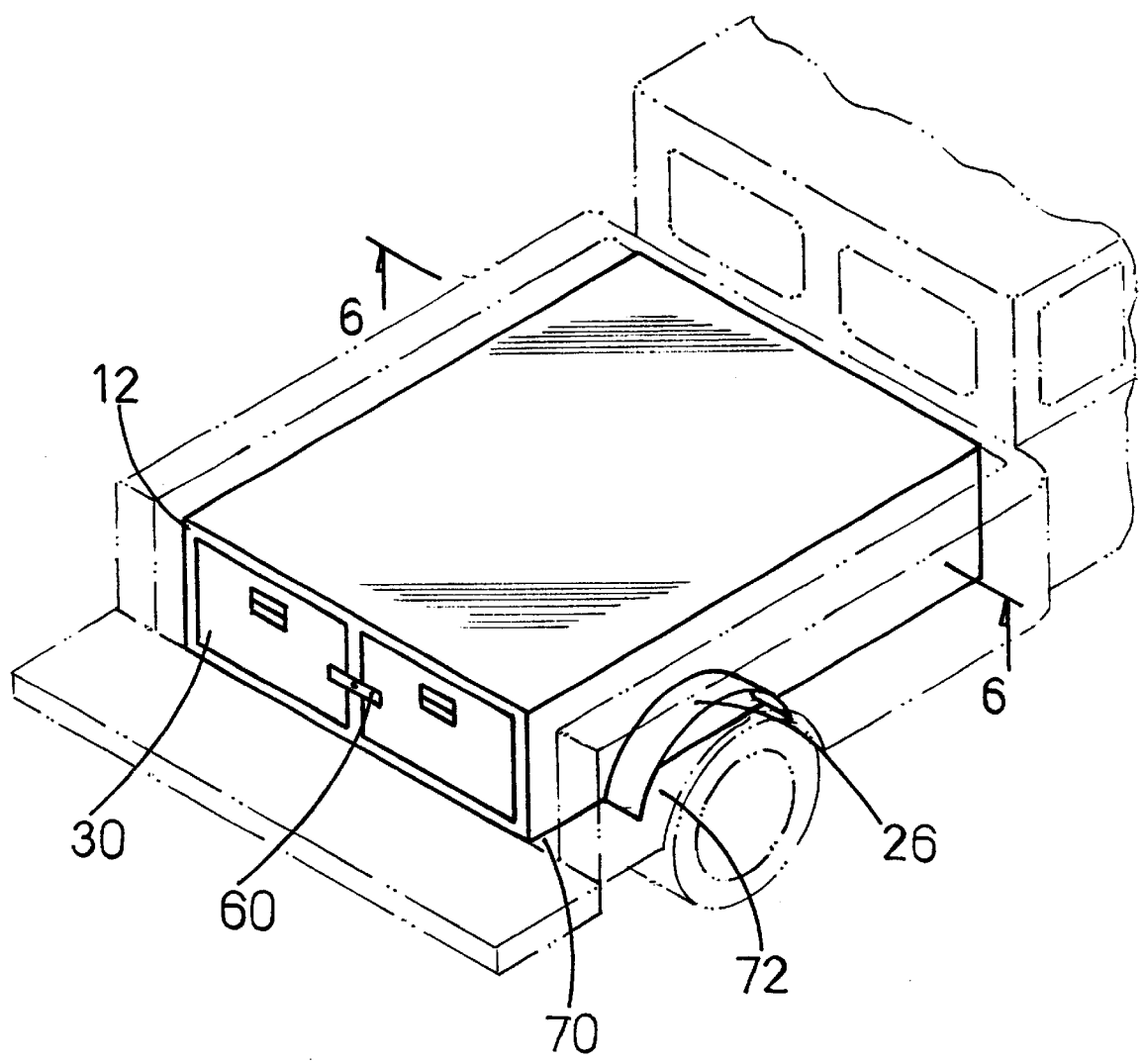
FIG. 1 is a schematic perspective view of a new pickup truck storage device according to the present invention.
Figure 2:
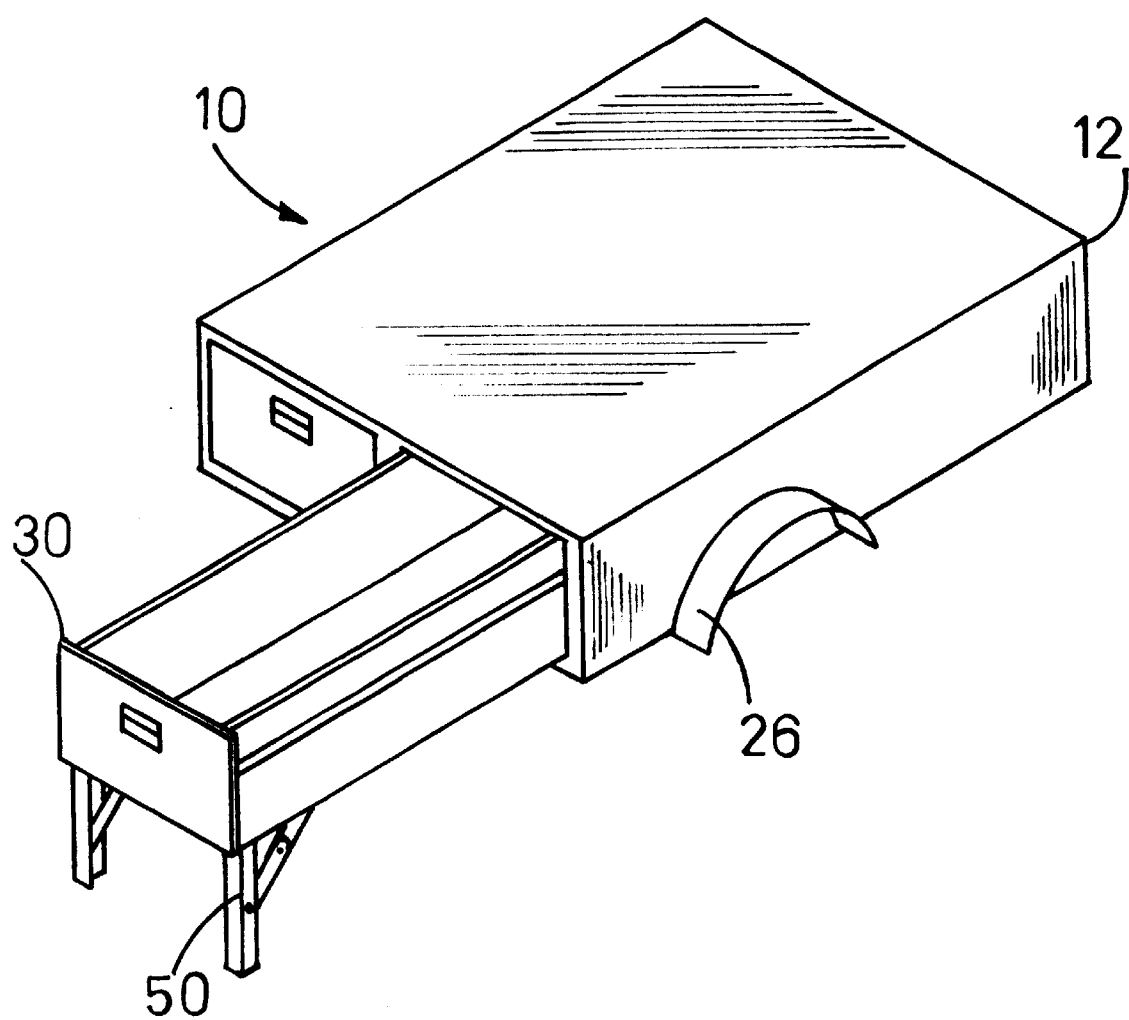
FIG. 2 is a schematic perspective view of the present invention.
Figure 5:
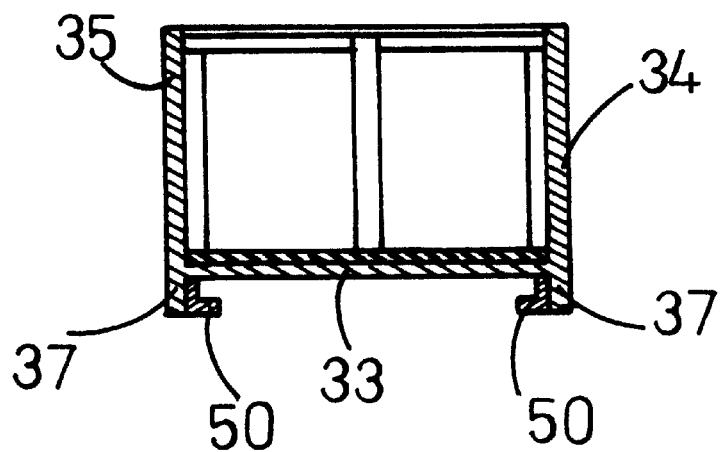
FIG. 5 is a schematic cross-sectional view taken along line 5—5 of the present invention.
Figure 6:
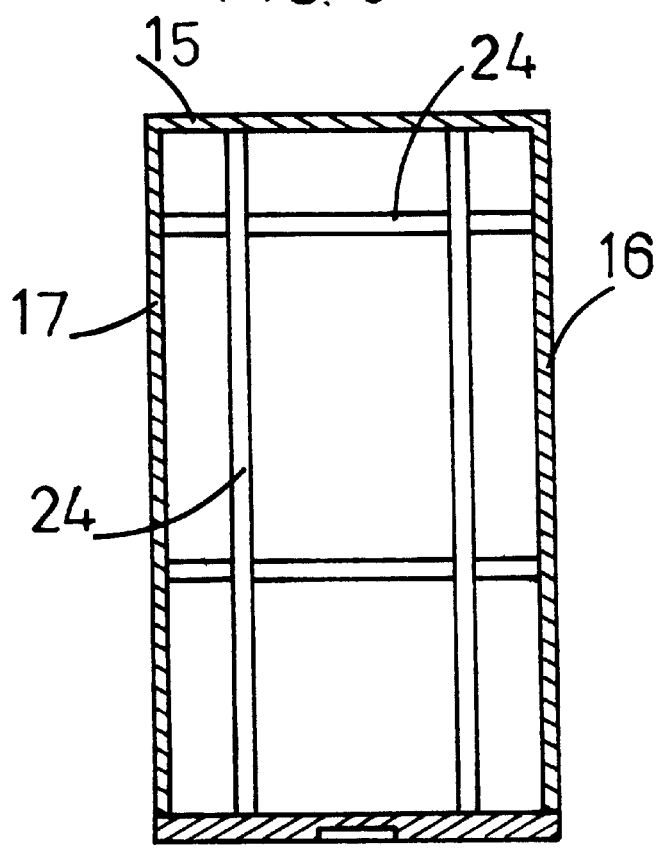
FIG. 6 is a schematic cross-sectional view taken along line 6—6 of the present invention.
Figure 7:
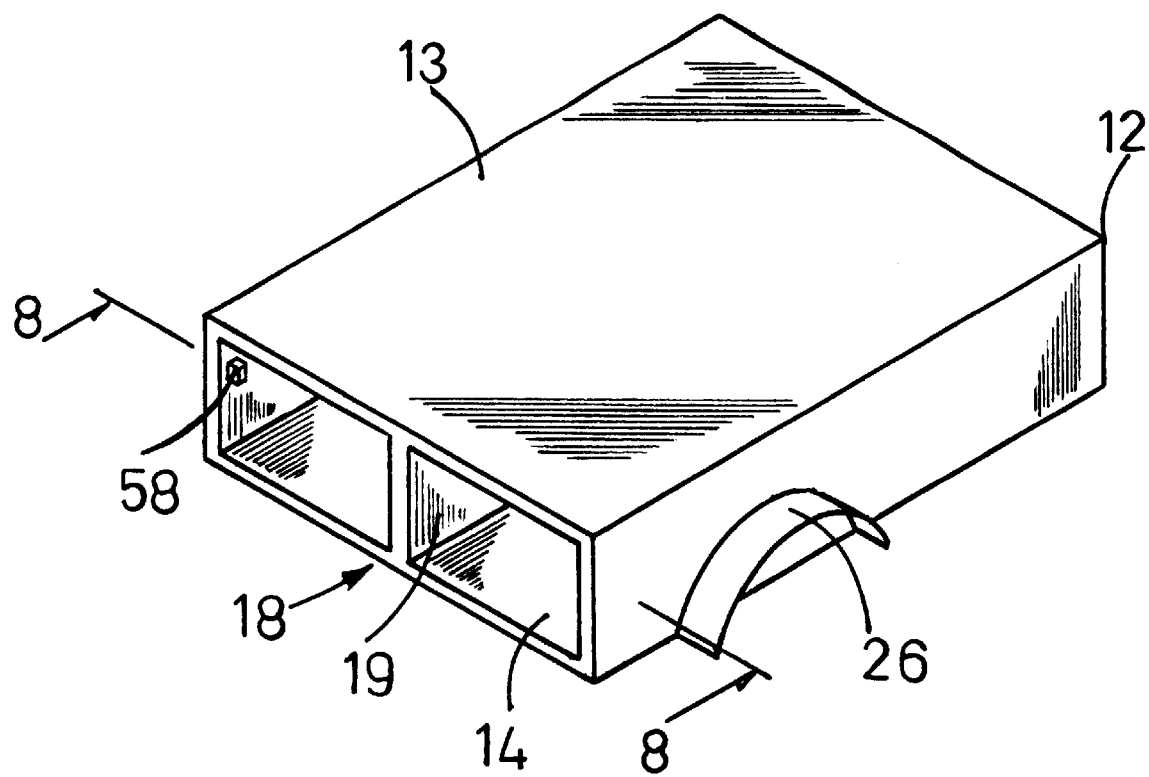
FIG. 7 is a schematic perspective view of the housing of the present invention.
Figure 8:
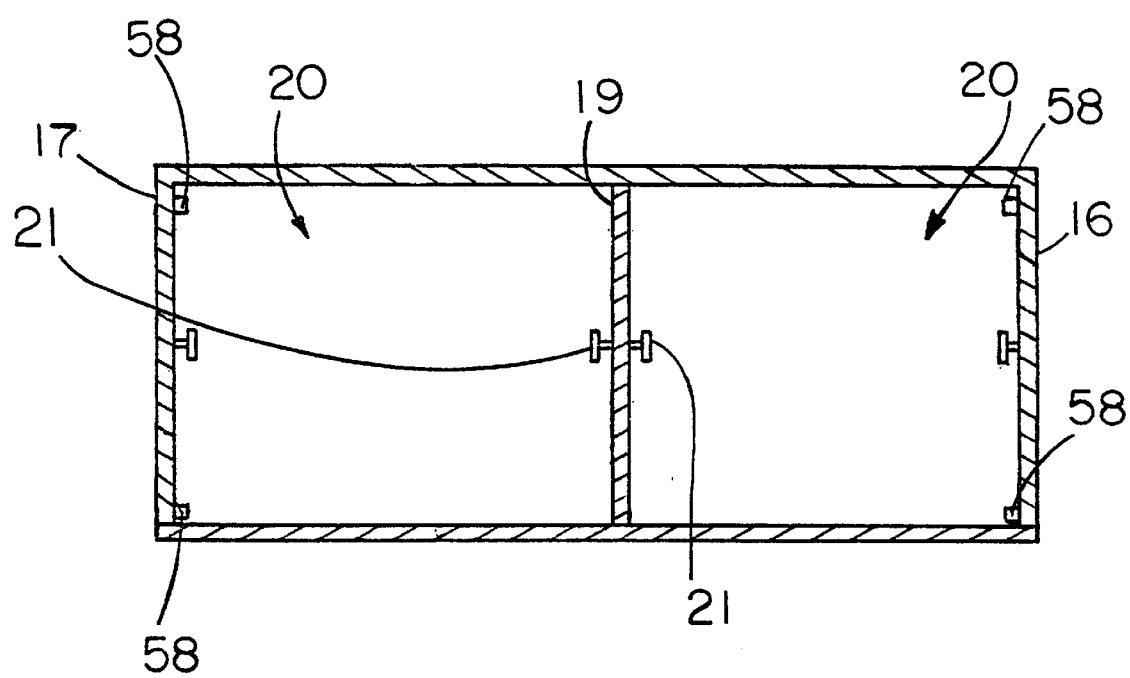
FIG. 8 is a schematic cross-sectional view taken along line 8—8 of the present invention.
Figure 9:
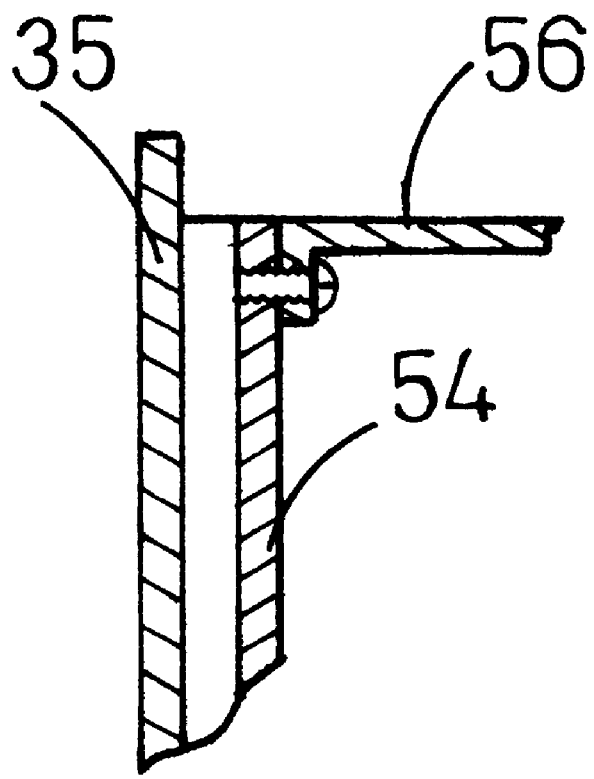
FIG. 9 is a schematic exploded view of the bracket member of the present invention.

With reference now to the drawings, and in particular to FIGS. 1 through 9 thereof, a new pickup truck storage device embodying the principles and concepts of the present invention and generally designated by the reference numeral 10 will be described.

As best illustrated in FIGS. 1 through 9, the pickup truck storage device 10 generally comprises a device having a length and width substantially equal to a length and width of a pickup bed 70 of a conventional truck and having a pair of wheel wells 72 therein. The device 10 includes a housing 12 which has a top wall 13, a bottom wall 14, a back wall 15, a first side wall 16 and a second side wall 17 such that a front side 18 of the housing 12 is generally open. Ideally, an intermediate wall 19 extends between and is integrally coupled to the top 13 and bottom 14 walls. The intermediate wall 19 generally extends between the back wall 15 and the front side 18 such that two compartments 20 are defined in the housing 12. The intermediate wall 19 is orientated generally parallel to and spaced between the first 16 and second 17 side walls. A plurality of aligned wheel members 21 is each rotatably coupled to an inside surface of the first 16 and second 17 walls. A plurality of aligned wheel members 21 is each rotatably coupled to a first and second opposite side of the intermediate wall 19. Each of the wheel members 21 has a rotational axis orientated generally perpendicular to the intermediate wall 19. Each of the wheel members 21 is positioned generally between the top 13 and bottom 12 walls.

Ideally, each of a plurality of reinforcing members 24 is elongate and is integrally coupled to and extending between the first 16 and second 17 walls. Each of the reinforcing members 24 generally abuts an inner surface of the top wall 13. Additional reinforcing members 24 may extend between the front and back sides of the housing.

Each of a pair of saddle members 26 comprises a semi-circular shoulder integrally coupled to and extending away from one of the first 16 and second 17 side walls. Each of the saddle members 26 is positioned for straddling one of the wheel wheels 72 when the housing 12 is positioned in the pickup bed 70.

Each of a pair of drawers 30 is extendably positionable in one of the compartments 20. If there is no intermediate wall 19, only one drawer 30 is extendably positioned in the housing 12. Each of the drawers 30 has a front side 31, a back side 32, a bottom side 33, a first lateral side 34 and a second lateral side 35. The front side 31 has an outer Surface having a depression 36 therein such that the depression 36 defines a handle. Each of a pair of elongate flanges 37 is integrally coupled to and extends downwardly away from a bottom edge of one of the first 34 and second 35 lateral sides. Each of the lateral sides has an inside surface and an outside surface. The drawers 30 preferably have a length nearly as long as the housing 12.

Preferably, each of the drawers 30 has a pair of rail members 40 thereon. Each of the rail members 40 is elongate and has a first end 41 and a second end 42. The rail members 40 are each securely attached to the outside surfaces of one of the lateral sides 34, 35 of the drawer 30 and extend generally between the front 31 and back 32 sides. Each of the rail members 40 is positioned such that the rail members 40 may ride along a top portion of the wheel members 21 within one compartment 20. Tabs 43 extend upwardly away from and are integrally coupled to the second ends 42 of the rail members 40.

Each of a pair of legs 50 has an end 51 hingedly coupled to an inside surface of one of the flanges 37 and positioned generally adjacent to the front side 31. Each of the legs 50 has a length generally between two feet and four feet. Preferably, collapsible support arms 52 are extended between each leg 50 and a corresponding flange 37.

A plurality of bracket members 54 are positioned in each of the drawers 30. Each of the bracket members 54 is securely attached to the inside surfaces of one of the first 34 and second 35 lateral sides.

A plurality of dividing members 56 is removably positionable between a pair of oppositely positioned bracket members 54.

A pair of stopping members 58 engage the tabs 43 and prevent the drawers 30 from falling out of the housing 12. Each of the stopping members 58 is integrally coupled to and extends away from the inside surfaces of one of the first 16 and second 17 side walls. The stopping members are each located generally adjacent to the front side 18 of the housing 12 and positioned to engage the tabs 43. The stopping members 58 preferably comprise protuberances.

A securing means 60 releasably secures the drawers 30 in the compartments 20. The securing means 60 comprises a rod pivotally coupled to an outer end of the intermediate wall 19. The rod pivots in a plane orientated generally parallel to the front sides 31 of the drawers 30. When it is turned in a generally horizontal orientation as shown in FIG. 1, the drawers do not slide out of the housing.

In use, the housing 12 is positioned in the bed 70 of the truck and the drawers 30 used as conventional drawers. The reinforcing members 24 reinforce the top wall of the housing allows items to be placed upon the housing 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pickup bed drawer device, said device having a length and width substantially equal to a length and width of a pickup bed, the pickup bed having a pair of wheel wells therein, said device comprising:
   a housing, said housing having a top wall, a bottom wall, a back wall, a first side wall and a second side wall such that a front side of said housing is generally open;
   a drawer, said drawer being extendably positionable through said front side and into said housing, said drawer comprising:
   a front side, a back side, a bottom side, a first lateral side and a second lateral side, each of a pair of elongate flanges being integrally coupled to and extending downwardly away from a bottom edge of one of said first and second lateral sides, each of said lateral sides having an inside surface and an outside surface; and
   a pair of legs, each of said legs having an end hingedly coupled to an inside surface of one of said flanges and positioned generally adjacent to said front side.

2. The pickup bed drawer as in claim 1, further comprising:
   a plurality of aligned wheel members being rotatably coupled to an inside surface of said first and second walls, each of said wheel members being positioned generally between said top and bottom walls; and
   a pair of rail members, each of said rail members being elongate and having a first end and a second end, each of said rail members being securely attached to the outside surfaces of one of said lateral sides of said drawer and extending generally between said front and back sides, each of said rail members being positioned such that said rail members may ride along a top portion of said wheel members.

3. The pickup bed drawer as in claim 1, further comprising:
   a pair of tabs, each of said tabs extending upwardly away from and integrally coupled to said second ends of one of said rail members; and
   a pair of stopping members for engaging said tabs, each of said stopping members being integrally coupled to and extending away from the inside surfaces of one of said first and second side walls, said stopping members being located generally adjacent to said front side of said housing and positioned to en gage said tabs.

4. The pickup bed drawer as in claim 2, wherein said drawer further comprises:
   a plurality of bracket members, each of said bracket members being securely attached to said inside surfaces of one of said first and second lateral sides; and
   a plurality of dividing members, each of said dividing members being removably positionable between a pair of oppositely positioned bracket members.

5. The pickup bed drawer as in claim 2, further comprising:
   a plurality of reinforcing members, each of said reinforcing members being elongate, each of said reinforcing members being integrally coupled to and extending between said first and second walls, each of said reinforcing members generally abutting an inner surface of said top wall.

6. The pickup bed drawer as in claim 1, further comprising:
   a plurality of reinforcing members, each of said reinforcing members being elongate, each of said reinforcing members being integrally coupled to and extending between said first and second walls, each of said reinforcing members generally abutting an inner surface of said top wall.

7. The pickup bed drawer as in claim 5, further comprising:
   a pair of saddle members, each of said saddle members comprising a semi-circular shoulder integrally coupled to and extending away from one of said first and second side walls, each of said saddle members being positioned for straddling one of said wheel wheels when said housing is positioned in said pickup bed.

8. The pickup bed drawer as in claim 1, further comprising:
  a pair of saddle members, each of said saddle members comprising a semi-circular shoulder integrally coupled to and extending away from one of said first and second side walls, each of said saddle members being positioned for straddling one of said wheel wheels when said housing is positioned in said pickup bed.

9. The pickup bed drawer as in claim 5, further comprising:
  a pair of saddle members, each of said saddle members comprising a semi-circular shoulder integrally coupled to and extending away from one of said first and second side walls, each of said saddle members being positioned for straddling one of said wheel wheels when said housing is positioned in said pickup bed.

10. A pickup bed drawer device, said device having a length and width substantially equal to a length and width of a pickup bed, the pickup bed having a pair of wheel wells therein, said device comprising:
  a housing, said housing having a top wall, a bottom wall, a back wall, a first side wall and a second side wall such that a front side of said housing is generally open, an intermediate wall extending between and being integrally coupled to said top and bottom walls, said intermediate wall extending generally between said back wall and said front side such that two compartments are defined in said housing, said intermediate wall being orientated generally parallel to and spaced between said first and second side walls;
  a pair of drawers, each of said drawers being extendably positionable in one of said compartments, each of said drawers comprising:
    a front side, a back side, a bottom side, a first lateral side and a second lateral side, each of a pair of elongate flanges being integrally coupled to and extending downwardly away from a bottom edge of one of said first and second lateral sides, each of said lateral sides having an inside surface and an out side surface; and
    a pair of legs, each of said legs having an end hingedly coupled to an inside surface of one of said flanges and positioned generally adjacent to said front side.

11. The pickup bed drawer device as in claim 10, said device further comprising:
  a plurality of aligned wheel members being rotatably coupled to an inside surface of said first and second walls, a plurality of aligned wheel members being rotatably coupled to a first and second opposite side of said intermediate wall, each of said wheel members having a rotational axis orientated generally perpendicular to said intermediate wall, each of said wheel members being positioned generally between said top and bottom walls; and
  each of said drawers further including;
    a pair of rail members, each of said rail members being elongate and having a first end and a second end, each of said rail members being securely attached to the outside surfaces of one of said lateral sides of said drawer and extending generally between said front and back sides, each of said rail members being positioned such that said rail members may ride along a top portion of said wheel members within one compartment.

12. The pickup bed drawer device as in claim 11, further comprising:
  the second end of each of said rail members having a tab integrally coupled thereto and extending upwardly therefrom; and
  a pair of stopping members for engaging said tabs, each of said stopping members being integrally coupled to and extending away from the inside surfaces of one of said first and second side walls, said stopping members being located generally adjacent to said front side of said housing and positioned to engage said tabs.

13. The pickup bed drawer device as in claim 11, further comprising:
  a securing means for releasably securing said drawers in said compartments, said securing means comprising a rod, said rod being pivotally coupled to an outer end of said intermediate wall, said rod pivoting in a plane orientated generally parallel to said front sides of said drawers.

14. The pickup bed drawer device as in claim 10, further comprising:
  a plurality of reinforcing members, each of said reinforcing members being elongate, each of said reinforcing members being integrally coupled to and extending between said first and second walls, each of said reinforcing members generally abutting an inner surface of said top wall.

15. The pickup bed drawer device as in claim 14, further comprising:
  a pair of saddle members, each of said saddle members comprising a semi-circular shoulder integrally coupled to and extending away from one of said first and second side walls, each of said saddle members being positioned for straddling one of said wheel wheels when said housing is positioned in said pickup bed.

16. The pickup bed drawer device as in claim 10, wherein each of said drawers further comprises:
  a plurality of bracket members, each of said bracket members being securely attached to said inside surfaces of one of said first and second lateral sides; and
  a plurality of dividing members, each of said dividing members being removably positionable between a pair of oppositely positioned bracket members.

17. A pickup bed drawer device, said device having a length and width substantially equal to a length and width of a pickup bed, the pickup bed having a pair of wheel wells therein, said device comprising:
  a housing, said housing having a top wall, a bottom wall, a back wall, a first side wall and a second side wall such that a front side of said housing is generally open, an intermediate wall extending between and being integrally coupled to said top and bottom walls, said intermediate wall extending generally between said back wall and said front side such that two compartments are defined in said housing, said intermediate wall being orientated generally parallel to and spaced between said first and second side walls, a plurality of aligned wheel members being rotatably coupled to an inside surface of said first and second walls, a plurality of aligned wheel members being rotatably coupled to a first and second opposite side of said intermediate wall, each of said wheel members having a rotational axis orientated generally perpendicular to said intermediate wall, each of said wheel members being positioned generally between said top and bottom walls;
  a plurality of reinforcing members, each of said reinforcing members being elongate, each of said reinforcing members being integrally coupled to and extending between said first and second walls, each of said reinforcing members generally abutting an inner surface of said top wall;

a pair of saddle members, each of said saddle members comprising a semi-circular shoulder integrally coupled to and extending away from one of said first and second side walls, each of said saddle members being positioned for straddling one of said wheel wheels when said housing is positioned in said pickup bed;

a pair of drawers, each of said drawers being extendably positionable in one of said compartments, each of said drawers comprising:

a front side, a back side, a bottom side, a first lateral side and a second lateral side, said front side having an outer surface having a depression therein such that said depression defines a handle, each of a pair of elongate flanges being integrally coupled to and extending downwardly away from a bottom edge of one of said first and second lateral sides, each of said lateral sides having an inside surface and an outside surface;

a pair of rail members, each of said rail members being elongate and having a first end and a second end, each of said rail members being securely attached to the outside surfaces of one of said lateral sides of said drawer and extending generally between said front and back sides, each of said rail members being positioned such that said rail members may ride along a top portion of said wheel members within one compartment, a pair of tabs, each of said tabs extending upwardly away from and integrally coupled to said second ends of one of said rail members;

a pair of legs, each of said legs having an end hingedly coupled to an inside surface of one of said flanges and positioned generally adjacent to said front side, each of said legs having a length generally between two feet and four feet;

a plurality of bracket members, each of said bracket members being securely attached to said inside surfaces of one of said first and second lateral sides;

a plurality of dividing members, each of said dividing members being removably positionable between a pair of oppositely positioned bracket members;

a pair of stopping members for engaging said tabs, each of said stopping members being integrally coupled to and extending away from the inside surfaces of one of said first and second side walls, said stopping members being located generally adjacent to said front side of said housing and positioned to engage said tabs; and a securing means for releasably securing said drawers in said compartments, said securing means comprising a rod, said rod being pivotally coupled to an outer end of said intermediate wall, said rod pivoting in a plane orientated generally parallel to said front sides of said drawers.

* * * * *